United States Patent
Lee et al.

(10) Patent No.: US 11,862,809 B2
(45) Date of Patent: Jan. 2, 2024

(54) SEPARATOR SEALING APPARATUS AND METHOD FOR PREVENTING BENDING OF SEPARATOR OF SECONDARY BATTERY

(71) Applicant: LG CHEM, LTD., Seoul (KR)

(72) Inventors: Min-Jae Lee, Daejeon (KR); Jong-Hun Kim, Daejeon (KR); Sung-Min Hwang, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 543 days.

(21) Appl. No.: 17/252,839

(22) PCT Filed: Apr. 14, 2020

(86) PCT No.: PCT/KR2020/095067
§ 371 (c)(1),
(2) Date: Dec. 16, 2020

(87) PCT Pub. No.: WO2021/015601
PCT Pub. Date: Jan. 28, 2021

(65) Prior Publication Data
US 2021/0167461 A1   Jun. 3, 2021

(30) Foreign Application Priority Data
Jul. 22, 2019   (KR) .................. 10-2019-0088483

(51) Int. Cl.
*H01M 50/403*   (2021.01)
*H01M 50/463*   (2021.01)
(Continued)

(52) U.S. Cl.
CPC ..... *H01M 50/403* (2021.01); *H01M 10/0583* (2013.01); *H01M 50/463* (2021.01); *H01M 10/0525* (2013.01)

(58) Field of Classification Search
CPC .......... H01M 50/403; H01M 10/0583; H01M 50/463; H01M 10/0525; H01M 50/406;
(Continued)

(56) References Cited

U.S. PATENT DOCUMENTS

2007/0154794 A1   7/2007   Kim et al.
2014/0013597 A1*  1/2014   Yuhara .............. H01M 10/0404
                                                     29/874
(Continued)

FOREIGN PATENT DOCUMENTS

CN   102468464 A  *  5/2012
EP    2 696 397 A1     2/2014
(Continued)

OTHER PUBLICATIONS

JP-2019008954-A Machine translation of Description (Year: 2023).*
(Continued)

*Primary Examiner* — Cynthia L Schaller
(74) *Attorney, Agent, or Firm* — Birch, Stewart, Kolasch & Birch, LLP (57) ABSTRACT

A separator sealing apparatus for bonding an upper separator and a lower separator with an electrode plate being interposed therebetween and a separator sealing method is provided. The separator sealing apparatus includes a first sealing unit configured to seal a first region specified as an outer edge along a width direction of the electrode plate, among portions where the upper separator and the lower separator face each other; and a second sealing unit configured to seal a second region specified as an outer edge along a length direction of the electrode plate, among the portions where the upper separator and the lower separator face each other.

10 Claims, 6 Drawing Sheets

(51) Int. Cl.
*H01M 10/0583* (2010.01)
*H01M 10/0525* (2010.01)

(58) Field of Classification Search
CPC ............ H01M 50/46; H01M 10/0585; H01M 10/052; H01M 10/615; H01M 50/186; H01M 10/0404; B29C 65/00; Y02E 60/10; Y02P 70/50
See application file for complete search history.

(56) References Cited

U.S. PATENT DOCUMENTS

| | | |
|---|---|---|
| 2014/0059875 A1 | 3/2014 | Yuhara et al. |
| 2015/0129107 A1 | 5/2015 | Miyazaki et al. |
| 2017/0317375 A1 | 11/2017 | Cho |
| 2019/0363389 A1 | 11/2019 | Ko et al. |

FOREIGN PATENT DOCUMENTS

| | | | |
|---|---|---|---|
| JP | 2007-242506 A | | 9/2007 |
| JP | 2018-120803 A | | 8/2018 |
| JP | 2019008954 A | * | 1/2019 |
| KR | 20-0175031 Y1 | | 3/2000 |
| KR | 10-2012-0052041 A | | 5/2012 |
| KR | 10-2013-0137229 A | | 12/2013 |
| KR | 10-2017-0094713 A | | 8/2017 |
| KR | 10-2017-0124298 A | | 11/2017 |
| KR | 10-1823176 B1 | | 1/2018 |
| KR | 10-2019-0045602 A | | 5/2019 |
| WO | WO 2014/080544 A1 | | 5/2014 |

OTHER PUBLICATIONS

CN-102468464-A Machine translation of Description (Year: 2023).*
Supplementary European Search Report mailed in EP 20 84 4263 dated Oct. 5, 2021.

* cited by examiner

SEPARATOR SEALING APPARATUS AND METHOD FOR PREVENTING BENDING OF SEPARATOR OF SECONDARY BATTERY

TECHNICAL FIELD

The present disclosure relates to a sealing apparatus and method for a separator of a secondary battery, and more particularly, to a sealing apparatus installed on a production line of a mono cell semi-finished product or a half cell semi-finished product to seal a separator in order to prevent bending of the separator, and its method.

The present application claims priority to Korean Patent Application No. 10-2019-0088483 filed on Jul. 22, 2019 in the Republic of Korea, the disclosures of which are incorporated herein by reference.

BACKGROUND ART

Recently, the demand for secondary batteries as an eco-friendly energy source has rapidly increased. Among the secondary batteries, a lithium secondary battery having a high energy density, a high working potential, a long cycle life and a low self-discharge rate has been commercialized and widely used.

The lithium secondary battery includes an electrode assembly in which a positive electrode plate and a negative electrode plate respectively coated with a positive electrode active material and a negative electrode active material are disposed with a separator being interposed therebetween, and an exterior, namely a battery case, in which the electrode assembly is hermetically accommodated together with an electrolyte.

The electrode assembly having the positive electrode/separator/negative electrode structure of the lithium secondary battery may be briefly classified into a jelly-roll type (winding type), a stacking type, and a stacking/folding type that is a mixture of the winding type and the stacking type.

The jelly-roll type electrode assembly is prepared by coating metal foils serving as a current collector with an electrode active material or the like, drying and pressing the metal foils, then cutting the metal foils into a band form with a desired width and length, separating a negative electrode and a positive electrode using a separator, and then winding the same into a spiral form. The jelly-roll type electrode assembly is suitable for cylindrical batteries.

A stacking type or stacking/folding type electrode assembly has a structure in which positive and negative electrode units are sequentially stacked with a separator being interposed there between, and may easily obtain a rectangular shape.

Figure 1:
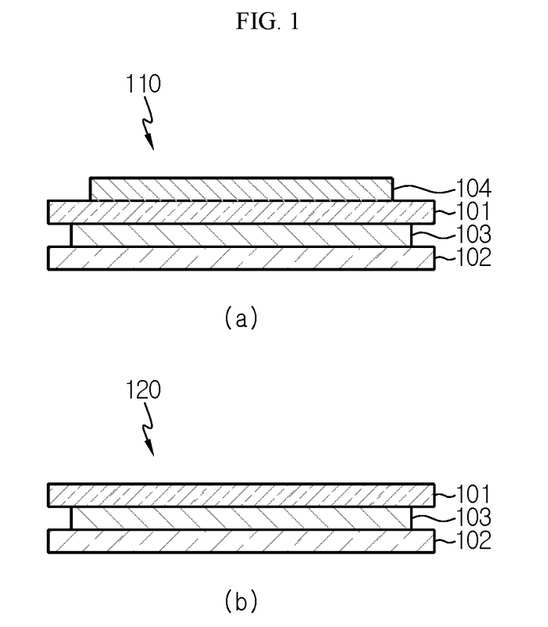
FIG. 1 is a cross-sectional view of cell semi-finished products schematically showing a stacked structure of a conventional mono cell semi-finished product and a half cell semi-finished product.

The stacking type or stacking/folding type lithium secondary battery may be obtained by repeatedly stacking mono cells 110 having a structure of a positive electrode plate 104/an upper separator 101/a negative electrode plate 103/a lower separator 102 as shown in FIG. 1 or folding the mono cells 110 using a continuous separator film, or by adding a positive electrode to an upper or lower portion of half cells 120 having a structure of an upper separator 101/a negative electrode plate 103/a lower separator 102.

Figure 2:
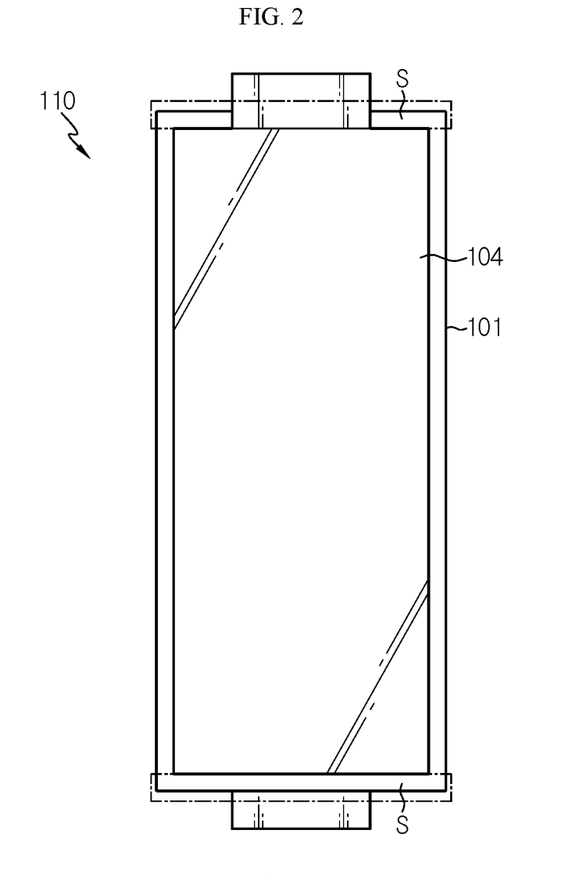
FIG. 2 is a plan view showing a conventional cell semi-finished product.

Meanwhile, in the stacking type or stacking/folding type lithium secondary battery, a low voltage defective cell in which the secondary battery exhibits a voltage drop behavior higher than the self-discharge rate is sometimes found. In this case, if an edge of the separator is folded or torn during the assembly process, the positive electrode and the negative electrode may directly face each other, which is a main cause of electric short circuit. For this reason, as shown in FIG. 2, a method of preventing a separator folding phenomenon by bonding edges S of the upper separator 101 and the lower separator 102 in a width direction of a cell semi-finished product has been proposed as the prior art.

However, the external exposure of the electrode between the upper separator 101 and the lower separator 102 is not blocked fundamentally just by sealing the edge of the cell semi-finished product only in the width direction. Thus, a method to further improve the low-voltage defect rate by fundamentally blocking the exposure of the electrode by additionally bonding the edges of the separator 102 in a length direction of the cell semi-finished product is being discussed.

DISCLOSURE

Technical Problem

The present disclosure is designed to solve the problems of the related art, and therefore the present disclosure is directed to providing a sealing apparatus and method, which may be easily applied to an existing cell semi-finished product production line and fundamentally prevent an electrode from being exposed out of the cell semi-finished product by bonding all edge lines of an upper separator and a lower separator along a width direction and a length direction.

Technical Solution

In one aspect of the present disclosure, there is provided a separator sealing apparatus for bonding an upper separator and a lower separator with an electrode plate being interposed therebetween, the separator sealing apparatus comprising:

a first sealing unit configured to seal a first region of the upper separator and the lower separator along a width direction of the electrode plate where the upper separator and the lower separator face each other; and a second sealing unit configured to seal a second region of the upper separator and the lower separator along a length direction of the electrode plate where the upper separator and the lower separator face each other.

The separator sealing apparatus may further comprise a transfer unit configured to continuously supply the electrode plate, the upper separator and the lower separator in one direction, and the first sealing unit and the second sealing unit may be configured to operate in synchronization with the transfer unit at a preset speed to move vertically to press and thermally fuse the first region and the second region.

The second sealing unit may be configured to be assembled to and disconnected from the first sealing unit to be adjustable according to a width of the electrode plate.

The first sealing unit may include a first upper heating block configured to apply pressure and heat to the first region of the upper separator; and a first lower heating block configured to apply pressure and heat to the first region of the lower separator, the first lower heating block being in a same vertical plane as the first lower heating block.

The first upper heating block may be configured to seal another first region of the upper separator and the lower separator along the width direction of the electrode plate. The first sealing unit may include a pair of first upper heating blocks configured to apply pressure and heat to the first regions of the upper separator, and the pair of first upper heating blocks may be spaced apart from each other at an interval to extend in one direction side by side; and a pair of first lower heating blocks configured to apply pressure and heat to the first regions of the lower separator, the pair of first lower heating blocks may be arranged to be vertically symmetric to the pair of first upper heating blocks.

The second sealing unit may be configured to seal another second region of the upper separator and the lower separator along the length direction of the electrode plate, and the second sealing unit may include a plurality of second upper heating blocks respectively configured to extend in a direction intersecting with the first upper heating block and coupled to the pair of first upper heating blocks at locations spaced apart from each other at a an interval along an extending direction of the pair of first upper heating blocks to apply heat and pressure to the second regions of the upper separator; and a plurality of second lower heating blocks provided to be symmetric with the second upper heating blocks in one-to-one relationship and coupled to the pair of first lower heating blocks to apply heat and pressure to the second regions of the lower separator.

The pair of first upper heating blocks may have a plurality of grooves formed along the extending direction, each of the second upper heating blocks may have a connection portion with a step formed in at least one end thereof, and each connection portion may be selectively fit into one of the plurality of grooves.

Each connection portion may be fixed and released by a bolt inserted into the one of the plurality of grooves of the pair of first upper heating blocks.

In another aspect of the present disclosure, there is also provide a separator sealing method for bonding an upper separator and a lower separator with an electrode plate being interposed therebetween using the separator sealing apparatus described above to seal the upper separator and the lower separator, the separator sealing method comprising:

sealing both the first region and the second region so that the electrode plate is not exposed to the outside.

The electrode plate may be a negative electrode plate in one of a mono cell semi-finished product in which the lower separator, the negative electrode plate, the upper separator and a positive electrode plate are stacked in order or a half cell semi-finished product in which the lower separator, the negative electrode and the upper separator are stacked in order.

Advantageous Effects

According to an embodiment of the present disclosure, it is possible to significantly reduce a low voltage defect rate by preventing the electrode from being exposed out of the cell semi-finished product.

According to another embodiment of the present disclosure, it is possible to continuously mass-produce cell semi-finished products by speed synchronization with an existing semi-finished product production line.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described in the specification and the configurations illustrated in the drawings are only preferred embodiments of the present disclosure, without representing all technical features of the present disclosure. In addition, in order to help the understanding of the present disclosure, the accompanying drawings are not drawn to scale, but the dimensions of some components may be exaggerated.

Figure 3:
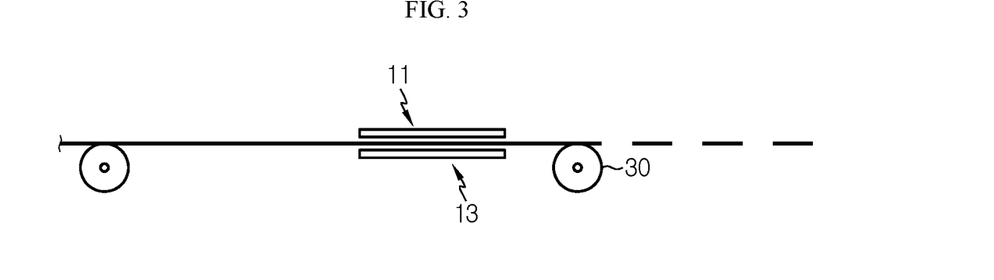
FIGS. 3 and 4 are diagrams for illustrating a process of sealing a separator of a cell semi-finished product by using a separator sealing apparatus according to an embodiment of the present disclosure.
Figure 4:
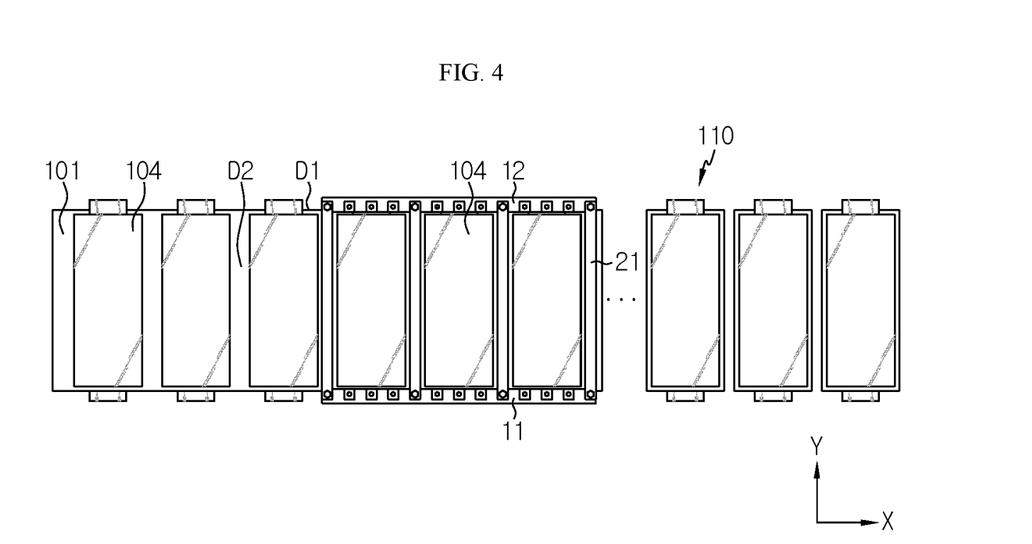

A separator sealing apparatus according to the present disclosure includes a first sealing unit 10, a second sealing unit 20 and a transfer unit 30, and as shown in FIGS. 3 and 4, before finally cutting a semi-finished product that is continuously supplied (see FIG. 1), a process of bonding an upper separator 101 and a lower separator 102 in cell units may be performed.

Here, the cell semi-finished product refers to a cell semi-finished product before final cutting. The cell semi-finished product before final cutting may include a lower separator 102 in the form of a continuous film, negative electrode plates 103 disposed on the lower separator 102 with a certain width to be spaced apart from each other, and an upper separator 101 provided on the negative electrode plate 103 in the form of a continuous film, or may include positive electrode plates 104 disposed on the upper separator 101 with a predetermined width to be spaced apart from each other.

Before the final cutting, cell semi-finished products, namely mono cell semi-finished products or half cell semi-finished products, may be continuously supplied in one direction by the transfer unit 30, and scheduled separator parts D1, D2 may be sealed by first sealing unit 10 and the second sealing unit 20. The first sealing unit 10 and the second sealing unit 20 may be operated in synchronization with the transfer unit 30 at a preset speed.

For example, if some of the cell semi-finished products before cutting reach a location for the separator sealing process, the transfer unit 30 stops working for a certain period of time. At this time, the first sealing unit 10 and the second sealing unit 20 may operate (move vertically) to press and thermally fuse the separator parts D1, D2, which require sealing, for a certain period of time. Then, the cell pressing operation of the first sealing unit 10 and the second sealing unit 20 is released, and the transfer unit 30 is operated again to move the cell semi-finished products before cutting. After that, the separator is cut using a cutter (not shown) to complete a final mono cell semi-finished product or a final half cell semi-finished product.

Hereinafter, the configuration of the first sealing unit 10 and the second sealing unit 20 will be described in more detail with reference to FIGS. 6 to 8.

The first sealing unit 10 and the second sealing unit 20 are means for bonding two separators of the cell semi-finished product, namely the upper separator 101 and the lower separator 102, to each other by applying heat and pressure. Here, the first sealing unit 10 may be configured to apply heat and pressure to a first region D1, the second sealing unit 20 may be configured to apply heat and pressure to a second region D2. The first sealing unit 10 and the second sealing unit 20 may be embodied using, for example, heating blocks having heating wires therein.

Here, the first region D1 (see FIG. 5) refers to an outer edge along a width direction of the electrode plate, among portions where the electrode plate, namely outer regions at both short sides of the electrode plate, where the upper separator 101 and the lower separator 102 face each other, and the second region D2 refers to an outer edge along a length direction of the electrode plate, namely outer regions at both long sides of the electrode plate, among the portions where the separator 101 and the lower separator 102 face each other.

Figure 6:
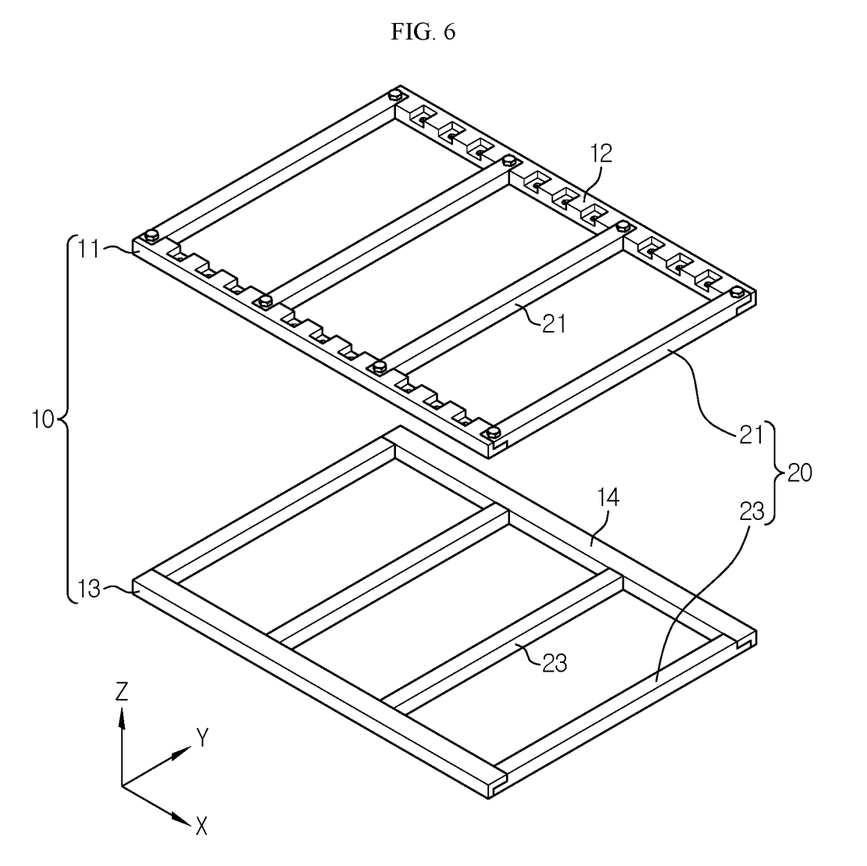
FIG. 6 is a diagram schematically showing a first sealing unit and a second sealing unit according to an embodiment of the present disclosure.

The first sealing unit 10 according to this embodiment may include first upper heating blocks 11, 12 and first lower heating blocks 13 and 14, as shown in FIG. 6.

Two first upper heating blocks 11, 12 are provided in a pair, and the pair of first upper heating blocks 11, 12 are disposed to be spaced apart from each other by a length of the cell semi-finished product (in the Y-axis direction) and extend in one direction (in the X-axis direction) side by side. In this embodiment, the extending length of the first upper heating blocks 11, 12 corresponds to approximately the width of three unit cell semi-finished product before cutting. Here, the extending length may be configured to be longer or shorter than this embodiment.

The first lower heating blocks 13, 14 are provided to be vertically symmetric with the first upper heating blocks 11, 12. That is, two first lower heating blocks 13, 14 are also provided in a pair, and the pair of first lower heating blocks 13, 14 may be provided to be symmetric with the pair of first upper heating blocks 11, 12.

As described above, the first sealing unit 10 including the pair of first upper heating blocks 11, 12 and the pair of first lower heating blocks 13, 14 may come into contact with the upper and lower portions of the first regions D1 of two separators of the plurality of cell semi-finished products and be operated to apply heat and pressure thereto.

That is, the first regions D1 of the upper separators 101 of the plurality of cell semi-finished products may be pressed downward at once by the first upper heating block 11, 12, and simultaneously the first regions D1 of the lower separators 102 may also be pressed upward at once by the first lower heating blocks 13, 14. At this time, the first region D1 of the upper separator 101 and the first region D1 of the lower separator 102 may be brought into contact with each other and be fused to each other by heat.

Meanwhile, the second sealing unit 20 is a means for sealing the second regions D2 of the upper separator 101 and the lower separator 102 facing each other, which cannot be sealed by the first sealing unit 10, and includes a plurality of second upper heating blocks 21 and a plurality of second lower heating blocks 23.

The second upper heating blocks 21 respectively extend in a direction (Y-axis direction) intersecting with the pair of first upper heating block 11, 12, and may be coupled to the pair of first upper heating blocks 11, 12 at locations spaced apart at a predetermined interval along the extending direction of the pair of first upper heating blocks 11, 12.

The second lower heating blocks 23 are provided to be vertically symmetric with the second upper heating blocks 21. In other words, the second lower heating blocks 23 are vertically symmetric with the second upper heating blocks 21 in one-to-one relationship, and are provided to be coupled to the pair of first lower heating blocks 13, 14, respectively.

The second upper heating blocks 21 and the second lower heating blocks 23 are heating blocks corresponding to the second regions D2 of the cell semi-finished products, and press the cell semi-finished products like the first sealing unit 10 to apply heat and pressure to the second regions of D2 of two separators.

More specifically, the second regions D2 of the upper separators 101 of the plurality of cell semi-finished products may be pressed downward at once by the second upper heating blocks 21, and simultaneously the second regions D2 of the lower separators 102 may be pressed upward at once by the second lower heating blocks 23. At this time, the second region D2 of the upper separator 101 and the second region D2 of the lower separator 102 may come into contact with each other and be fused to each other by heat.

Figure 5:
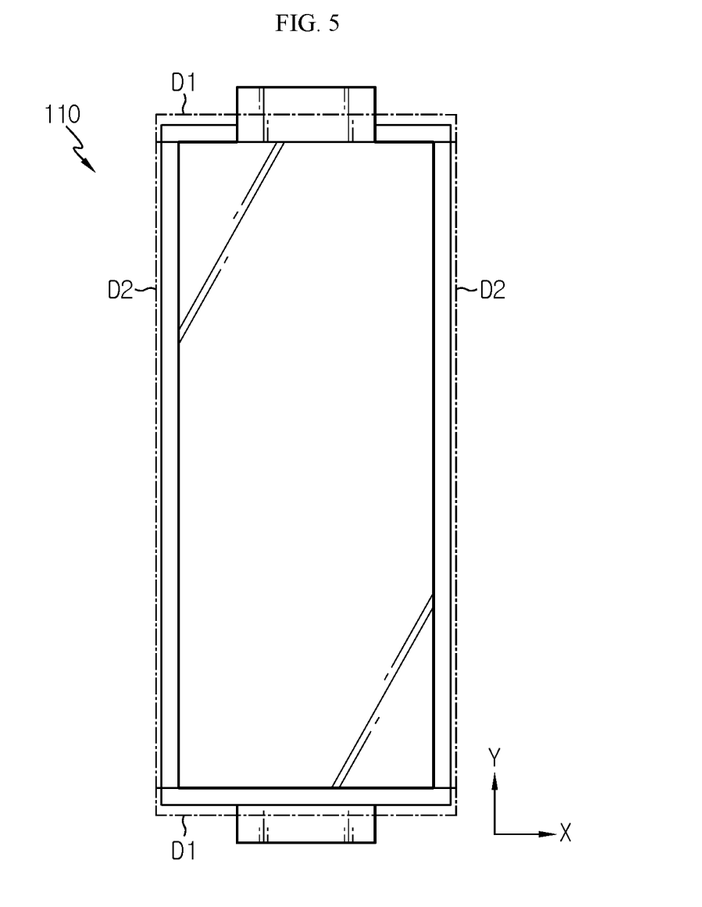
FIG. 5 is a plan view showing the cell semi-finished product of FIG. 4 after final cutting.

According to the separator sealing apparatus having the above configuration and operation, after final cutting, as the first region D1 and the second region D2 of the upper separator 101 and the lower separator 102, namely the upper separator 101 and the lower separator 102 facing each other at outer regions in the width direction and the length direction of the electrode plate, are completely bonded, it is possible to produce cell semi-finished products where the electrode plate (negative electrode plate) is fundamentally prevented from being exposed to the outside. If a stacking type or stacking/folding type lithium secondary battery is assembled using the cell semi-finished products 110, a low voltage defect rate of the lithium secondary battery may be significantly lowered in comparison to the prior art.

In addition, by sealing the separators of the plurality of cell semi-finished products while continuously moving the cell semi-finished products before cutting along the production direction in speed synchronization with the transfer unit 30, it is possible to continuously mass-produce final cell semi-finished products 110.

Meanwhile, the first sealing unit 10 and the second sealing unit 20 according to an embodiment of the present disclosure may be provided to be assembled and disassembled with each other. Hereinafter, the assembling and disassembling configuration of the first sealing unit 10 and the second sealing unit 20 will be described.

The assembling and disassembling configuration of the first upper heating block 11, 12 and the second upper heating blocks 21 is the same as the assembling and disassembling configuration of the first lower heating block 13, 14 and the second lower heating block 23. Thus, the assembling and disassembling configuration of the first lower heating block 13, 14 and the second lower heating blocks 23 will not be described in detail again.

Figure 7:
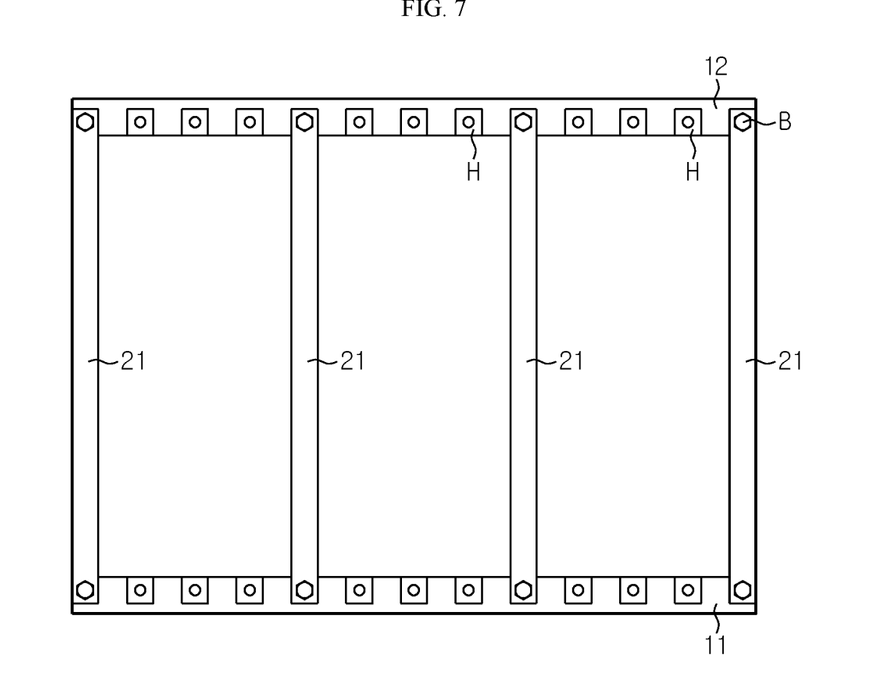
FIG. 7 is a plan view showing a first upper heating block and a second upper heating block of FIG. 6 assembled with each other.
Figure 8:
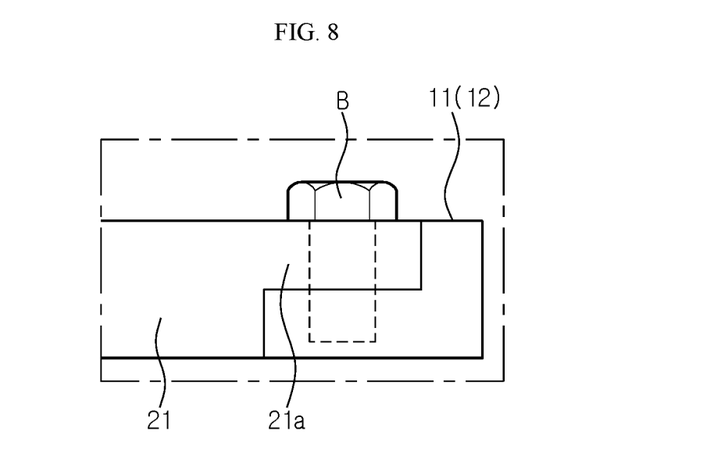
FIG. 8 is a cross-sectioned view schematically showing a coupling portion of the first upper heating block and the second upper heating block of FIG. 7.

As shown in FIGS. 7 and 8, the pair of first upper heating blocks 11, 12 have a plurality of grooves H formed at regular intervals along the extending direction. The second upper heating blocks 21 may be coupled to the pair of first upper heating blocks 11, 12 by selecting one of the plurality of grooves H and fitting an end of the second upper heating block 21 into the corresponding groove H.

More specifically, the second upper heating blocks 21 may have connection portions 21a with a step formed at both ends thereof, and the connection portions 21a may be placed in the grooves H of the first upper heating blocks 11, 12 in a fitting manner and may be fixed to and released from the grooves H by a bolt B. Although not shown in the figures, a hole having a thread formed in may be provided in the groove H of the connection portion 21a and the first upper heating blocks 11, 12 so that the bolt B may be vertically fastened.

According to the above configuration, it is possible to adjust the interval between the second upper heating blocks 21 or to further increase or decrease the number of the second upper heating blocks 21, which makes it possible to seal separators of various cell semi-finished products with different widths by using one separator sealing apparatus.

In addition, if some of the heating blocks in the separator sealing apparatus are damaged, the separator sealing apparatus may be normally used by replacing only the corresponding heating blocks. Therefore, it may be effective in terms of management and maintenance of the separator sealing apparatus.

Subsequently, a method of sealing the separators of the cell semi-finished products using the aforementioned separator sealing apparatus will be briefly summarized as follows.

Referring to FIGS. 3 and 4 again, the cell semi-finished products before cutting may be continuously supplied along the producing direction (X-axis direction) by the transfer unit 30. The cell semi-finished products before cutting may be a mono cell semi-finished product in which the lower separator 102, the negative electrode plate 103, the upper separator 101 and the positive electrode plate 104 are stacked in order, or a half cell semi-finished product in which the lower separator 102, the negative electrode and the upper separator 101 are stacked in order.

The first sealing unit 10 and the second sealing unit 20 may be disposed at one side of the cell semi-finished product production line as above, and may be operated in synchronization with the transfer unit 30. As shown in FIG. 4, if three cell semi-finished products reach a sealing process area by the transfer unit 30, the first sealing unit 10 and the second sealing unit 20 operate integrally in the vertical direction to press and thermally fuse the first region D1 and the second region D2 of each cell semi-finished product during a preset time. If the preset time passes, the first sealing unit 10 and the second sealing unit 20 are returned to the original locations, and next three cell semi-finished products in an unsealed state are placed in the sealing process area by the transfer unit 30. After the above sealing process, the cell semi-finished products may be cut one by one using a cutter (not-shown) while moving along the production line so as to be produced in the form of a final unit cell semi-finished product.

As described above, the separator folding problem may be solved by implementing the separator sealing apparatus and the separator sealing method of the present disclosure, and various kinds of mono cell or half cell semi-finished products of different widths may be mass-produced in the same production line.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A separator sealing apparatus for bonding an upper separator and a lower separator with an electrode plate being interposed therebetween, the separator sealing apparatus comprising:
   a first sealing unit configured to seal a first region of the upper separator and the lower separator along a width direction of the electrode plate where the upper separator and the lower separator face each other; and
   a second sealing unit configured to seal a second region of the upper separator and the lower separator along a length direction of the electrode plate where the upper separator and the lower separator face each other,
   wherein the first sealing unit and the second sealing unit are detachably coupled to each other.

2. The separator sealing apparatus according to claim 1, further comprising a transfer unit configured to continuously supply the electrode plate, the upper separator and the lower separator in one direction,
   wherein the first sealing unit and the second sealing unit are configured to operate in synchronization with the transfer unit at a preset speed to move vertically to press and thermally fuse the first region and the second region.

3. The separator sealing apparatus according to claim 1, wherein the second sealing unit is adjustable relative to the first sealing unit according to a width of the electrode plate.

4. The separator sealing apparatus according to claim 1, wherein the first sealing unit includes:
   a first upper heating block configured to apply pressure and heat to the first region of the upper separator; and
   a first lower heating block configured to apply pressure and heat to the first region of the lower separator, the first lower heating block being in a same vertical plane as the first upper heating block.

5. The separator sealing apparatus according to claim 1, wherein the first sealing unit is configured to seal another first region of the upper separator and the lower separator along the width direction of the electrode plate, and the first sealing unit includes:
   a pair of first upper heating blocks configured to apply pressure and heat to the first regions of the upper separator, the pair of first upper heating blocks being spaced apart from each other at an interval to extend in one direction side by side; and
   a pair of first lower heating blocks configured to apply pressure and heat to the first regions of the lower separator, the pair of first lower heating blocks are arranged opposite the pair of first upper heating blocks.

6. A separator sealing apparatus for bonding an upper separator and a lower separator with an electrode plate being interposed therebetween, the separator sealing apparatus comprising:
   a first sealing unit configured to seal a first region of the upper separator and the lower separator along a width direction of the electrode plate where the upper separator and the lower separator face each other; and
   a second sealing unit configured to seal a second region of the upper separator and the lower separator along a length direction of the electrode plate where the upper separator and the lower separator face each other, wherein the first sealing unit is configured to seal another first region of the upper separator and the lower separator along the width direction of the electrode plate, and the first sealing unit includes:
- a pair of first upper heating blocks configured to apply pressure and heat to the first regions of the upper separator, the pair of first upper heating blocks being spaced apart from each other at an interval to extend in one direction side by side; and
- a pair of first lower heating blocks configured to apply pressure and heat to the first regions of the lower separator, the pair of first lower heating blocks are arranged opposite the pair of first upper heating blocks, wherein the second sealing unit is configured to seal another second region of the upper separator and the lower separator along the length direction of the electrode plate, and the second sealing unit includes:
- a plurality of second upper heating blocks respectively configured to extend in a direction intersecting with the first upper heating block and coupled to the pair of first upper heating blocks at locations spaced apart from each other at an interval along an extending direction of the pair of first upper heating blocks to apply heat and pressure to the second regions of the upper separator; and
- a plurality of second lower heating blocks provided to be symmetric with the second upper heating blocks in one-to-one relationship and coupled to the pair of first lower heating blocks to apply heat and pressure to the second regions of the lower separator.

7. The separator sealing apparatus according to claim 6, wherein the pair of first upper heating blocks have a plurality of grooves formed along the extending direction,
- wherein each of the second upper heating blocks has a connection portion with a step formed in at least one end thereof, and
- wherein each connection portion is selectively fit into one of the plurality of grooves.

8. The separator sealing apparatus according to claim 7, wherein each connection portion is fixed and released by a bolt inserted into the connection portion and the one of the plurality of grooves of the pair of first upper heating blocks.

9. A separator sealing method for bonding an upper separator and a lower separator with an electrode plate being interposed therebetween using the separator sealing apparatus according to claim 1, the separator sealing method comprising:
- sealing both the first region and the second region so that the electrode plate is not exposed to the outside.

10. The separator sealing method according to claim 9, wherein the electrode plate is a negative electrode plate in one of a mono cell semi-finished product in which the lower separator, the negative electrode plate, the upper separator and a positive electrode plate are stacked in order or a half cell semi-finished product in which the lower separator, the negative electrode and the upper separator are stacked in order.

* * * * *